United States Patent
Wiedemann

(10) Patent No.: US 7,092,031 B1
(45) Date of Patent: Aug. 15, 2006

(54) DIGITAL CAMERA IMAGING MODULE

(75) Inventor: Rudolf A. Wiedemann, Fremont, CA (US)

(73) Assignee: Zoran Corporation, Sunnyvale, CA (US)

( * ) Notice: Subject to any disclaimer, the term of this patent is extended or adjusted under 35 U.S.C. 154(b) by 0 days.

(21) Appl. No.: 09/364,565

(22) Filed: Jul. 30, 1999

(51) Int. Cl.
*H04N 5/225* (2006.01)
*H01L 27/00* (2006.01)

(52) U.S. Cl. .................... 348/374; 348/340; 250/208.1

(58) Field of Classification Search ................ 348/340, 348/373, 374, 375, 376, 207.1, 207.11, 211.99, 348/211.5, 211.14, 357; 358/482; 396/433, 396/427; 250/208.1

See application file for complete search history.

(56) References Cited

U.S. PATENT DOCUMENTS

| | | | | |
|---|---|---|---|---|
| 4,639,772 A * | 1/1987 | Sluyter et al. | .............. | 348/373 |
| 4,734,778 A * | 3/1988 | Kobayashi | .................... | 348/335 |
| 4,896,217 A * | 1/1990 | Miyazawa et al. | .......... | 348/374 |
| 5,060,001 A * | 10/1991 | Kaneda | ........................ | 348/347 |
| 5,302,778 A * | 4/1994 | Maurinus | .................... | 257/432 |
| 5,359,190 A * | 10/1994 | O'Regan | .................... | 250/216 |
| 5,400,072 A * | 3/1995 | Izumi et al. | ................ | 348/335 |
| 5,408,285 A * | 4/1995 | Azegami et al. | ............ | 396/349 |
| 5,572,372 A * | 11/1996 | Sekine et al. | ................ | 359/824 |
| 5,821,532 A * | 10/1998 | Beaman et al. | ............. | 250/239 |
| 6,122,009 A * | 9/2000 | Ueda | ........................... | 348/373 |
| 6,335,759 B1 * | 1/2002 | Harada | ....................... | 348/373 |

(Continued)

FOREIGN PATENT DOCUMENTS

| | | |
|---|---|---|
| JP | 04223453 A * | 8/1992 |
| JP | 10246848 A * | 9/1998 |

OTHER PUBLICATIONS

Schaufelbuhl et al.; "Uncooled Low-Cost thermal imager Based on Micromachined CMOS Integrated Sensor Array"; Dec. 2001; Journal of Microelectromechanical Systems; vol. 10, No. 4, pp. 503-510.*

Sengupta et al.; "Packaging Requirements and Solutions for CMOS Imaging Sensors"; 1998; International Electronics Manufacturing Technology Symposium; pp. 194-198.*

Karasawa et al.; "Flip Chip Interconnection Method Applied to Small Camera Module"; 2001; Electronic Componenets and Technology Conference.*

*Primary Examiner*—David Ometz
*Assistant Examiner*—John M. Villecco
(74) *Attorney, Agent, or Firm*—Lowrie, Lando & Anastasi, LLP

(57) ABSTRACT

The invention provides a camera subassembly which includes a housing, a window, a lens, at least a first member, and movement imparting apparatus. The housing has a first opening through which light can enter into the housing, and a second, opposing opening. The window closes the first opening so that the housing and the window are formed so that, when the housing is mounted to a substrate so that the substrate closes the second opening, the housing, the first lens, and the board form an enclosure which is substantially sealed against ingress of contaminants. The lens is located within the enclosure. The first member mounts the lens to the housing so that the lens is moveable relative to the housing backward and forward in a direction in which light passes from the first opening through the housing to the second opening. The movement imparting apparatus is at least partially secured to the housing and at least partially secured to the lens and, when operated, causes backward and forward movement of the lens in the direction in which light passes through the housing.

34 Claims, 3 Drawing Sheets

U.S. PATENT DOCUMENTS

| | | |
|---|---|---|
| 6,529,689 B1 * | 3/2003 | Oshima .................... 396/535 |
| 2002/0044215 A1 * | 4/2002 | Takagi et al. ............. 348/374 |
| 2003/0137595 A1 * | 7/2003 | Takachi .................... 348/340 |
| 2004/0095499 A1 * | 5/2004 | Ning ........................ 348/335 |
| 2004/0207745 A1 * | 10/2004 | Tsuruta et al. ............ 348/335 |
| 2005/0122423 A1 * | 6/2005 | Castaneda et al. ........ 348/373 |
| 2006/0007351 A1 * | 1/2006 | Choi et al. ................ 348/374 |
| 2006/0066745 A1 * | 3/2006 | Lee et al. .................. 348/357 |

* cited by examiner

DIGITAL CAMERA IMAGING MODULE

BACKGROUND OF THE INVENTION

1). Field of the Invention

This invention relates to a camera imaging module of the kind which is used for taking digital pictures.

2). Discussion of Related Art

Digital cameras are becoming increasingly popular for purposes of capturing images digitally, storing the images in memory, and later downloading the stored images to a computer.

A digital camera is typically manufactured by first mounting a series of lenses inside a housing under fabrication conditions that are controlled to ensure optimum optical results. The subassembly including the housing and the lenses is then usually shipped to an entity which mounts the camera subassembly to a printed circuit substrate having a light detector array or other imager thereon. The conditions under which the camera subassembly is mounted to the printed circuit substrate is often not controlled to the degree which will ensure optimum optical results. For example, conditions under which the camera subassembly is mounted to the printed circuit substrate are often not clean enough, resulting in contaminants being trapped inside an enclosure which is defined by the housing and the printed circuit substrate, or for a lens to be mis-aligned with respect to an imager.

Furthermore, the housing usually includes two components which are rotatably engaged with one another. By rotating one of the components relative to the other, utilizing an extraneous device, the total length of the housing can be adjusted and the positioning of the lenses can be adjusted relative to the imager to maintain an image, created on the imager, in focus. Unfortunately, dust can also enter the housing through an interface between the two components.

SUMMARY OF THE INVENTION

The invention provides a camera subassembly which includes a housing, a window, a lens, at least a first member, and movement imparting apparatus. The housing has a first opening through which light can enter into the housing and a second, opposing opening. The window closes the first opening so that the housing and the window are formed so that, when the housing is mounted to a substrate so that the substrate closes the second opening, the housing, the first window, and the board from an enclosure which is substantially sealed against ingress of contaminants. The lens is located with in the enclosure. The first member mounts the lens to the housing so that the lens is moveable relative to the housing backward and forward in a direction in which light passes from the first opening through the housing to the second opening. The movement imparting apparatus is at least partially secured to the housing and at least partially secured to the lens and, when operated causes backward and forward movement of the lens in the direction in which light passes through the housing.

The positioning of the first and second openings relative to one another preferably cannot be changed.

The window may be a refractory lens or a simple window with no optical focusing power.

The camera subassembly may include a printed circuit substrate to which the housing is mounted so that the printed circuit substrate closes the second opening of the first lens, the housing, the window, and the printed circuit substrate forming an enclosure which is substantially sealed against ingress of contaminants. An imager is mounted within the enclosure to the printed circuit substrate in a position wherein light is focused on the imager after passing through the window and the lens.

The camera subassembly may include a connector on the printed circuit substrate at a location externally of the enclosure, the connector being within electrical communication with the imager. The socket may have terminals through which at least power and control signals can be supplied to and image data can be communicated with the imager.

The imager may be a detector array.

The first member may be an elongate member having a first end connected to the housing and a second end connected to the lens.

The first and second elongate members may each coil around an axis which extends in the direction in which light passes through the housing.

The first elongate member may coil in a first plane, and the second elongate member may coil together with the first elongate member in substantially the first plane.

When viewed in the direction in which light travels through the housing, the first ends of respectively the first and second elongate members may be connected to the housing on opposing sides of the lens.

The camera subassembly may include a third elongate member, having a first end connected to the housing, and spaced from the first end of the first elongate member in the direction in which light travels through the housing, and a second end, connected to the lens and spaced from the second end of the third elongate member in the direction in which light travels through the housing, wherein the third elongate member coils around an axis which extends in the direction in which light travels through the housing.

The camera subassembly may include at least one stiffener element which is connected between the first elongate member and the third elongate member.

The camera subassembly may include a fourth elongate member having a first end connected to the housing and spaced from the first end of the second elongate member in the direction in which light travels through the housing, and a second end, connected to the second lens and spaced from the second end of the second elongate member in the direction in which light travels through the housing. The fourth elongate member coils around an axis which extends in the direction in which light travels through the housing.

The first end of the first elongate member may be spaced from the first end of the second elongate member in the direction in which light travels through the housing, and the second end of the first elongate member may be spaced from the second end of the second elongate member in the direction in which light travels through the housing.

The camera subassembly may include a mounting structure within the enclosure, wherein the member is mounted to the mounting structure and the lens is mounted to the mounting structure, so that the lens is connected to the member via the mounting structure.

The camera subassembly may include at least an additional lens mounted to the mounting structure, the lenses being moveable together with the mounting structure relative to the housing.

The movement imparting apparatus may include at least a first electrical coil which, when energized, causes movement of the lens relative to the housing.

The first electric coil may be mounted within the enclosure.

The first electric coil may be connected to the lens.

The first member may be at least partially conductive and the first electric coil may be electrically accessed through the first member.

The movement imparting apparatus may include at least a second electric coil located within the enclosure and connected to the lens, wherein the second electric coil, when energized, causes movement of the lens relative to the housing.

The first member may be at least partially conductive and the first electric coil may be electrically accessed through the first member, the camera subassembly including a second member which mounts the lens to the housing for movement relative to the housing and the second electric coil may be electrically accessed through the second member.

The movement imparting apparatus may include a permanent magnet, mounted to the housing, which cooperates with the first electric coil to cause movement of the first electric coil relative to the permanent magnet when the first electric coil is energized.

The invention also provides a camera subassembly which includes a housing, a lens located within the housing, and at least a first member having a first end secured to the housing and a second end secured to the lens so as to mount the lens to the housing, and an elongate section between the first and second ends to allow for backward and forward movement of the lens relative to the housing in a direction of an axis of revolution of the lens.

The at least first member preferably allows for movement of the lens in the direction of the axis of revolution only.

The first elongate member may have a thickness in a direction in the axis of revolution, and a width in a direction transverse to the axis of revolution, the width being more than the thickness.

The first elongate member may coil around the axis of revolution.

The camera subassembly may include a second elongate member having a first end connected to the housing and a second end connected to the lens, wherein the first and second elongate members are spaced from one another in a direction in which the axis of revolution extends, and the second ends of the first and second elongate members are spaced from one another in a direction in which the axis of revolution extends.

The invention also provides a method of assembling a camera subassembly. A housing is mounted to a printed circuit substrate so that the housing, the printed circuit substrate, and a window jointly define an enclosure which is substantially sealed against ingress of contaminants, and a second lens is mounted within the enclosure by a flexible member which allows for backward and forward movement of the second lens relative to the housing.

The invention also provides a method of assembling a camera subassembly. An opening into a housing is closed with a window. A lens is located within the housing. The lens and the housing are interconnected by at least a first flexible member which, due to its flexibility, allows for backward and forward movement of the second lens relative to the housing along a direction in which light travels through the housing.

BRIEF DESCRIPTION OF THE DRAWINGS

The invention is further described by way of example with reference to the accompanying drawings wherein.

DETAILED DESCRIPTION OF THE INVENTION

Figure 1:
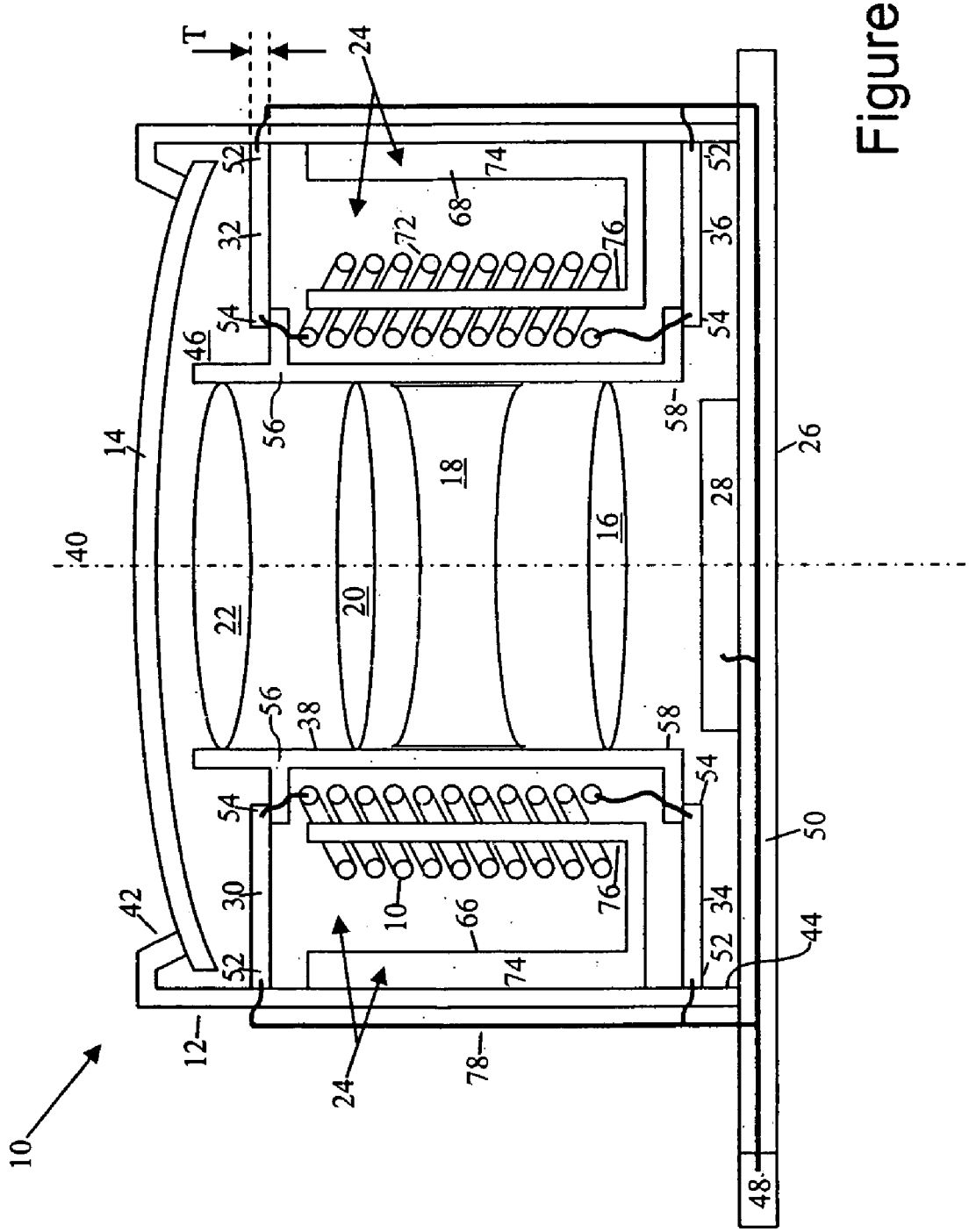
FIG. 1 is a cross-sectional side view of a camera subassembly according to an embodiment of the invention.

FIG. 1 of the accompanying drawings illustrates a camera subassembly 10 according to an embodiment of the invention. The camera subassembly 10 includes a housing 12, a window 14, a first lens 16, a second lens 18, a third lens 20, a fourth lens 22, movement imparting apparatus 24, a printed circuit substrate 26, an imager 28, a first elongate member 30, a second elongate member 32, a third elongate member 34, a fourth elongate member 36, and a mounting structure 38.

The housing 12 is in the form of a tube having a center line 40 extending along the length thereof. The tubular housing 12 has a first opening 42 at one end thereof, and a second opening 44 at an opposing end thereof. The positioning of the first and second openings 42 and 44 relative to one another cannot be changed. The window 14 closes the first opening 42.

The housing 12 is mounted to the printed circuit substrate 26 so that the printed circuit substrate 26 closes the second opening 44. It should be noted that the housing 12, the window 14, and the printed circuit substrate 26 are formed and mounted to one another so as to jointly form an enclosure 46 which is substantially sealed against ingress of contaminants.

The printed circuit substrate 26 includes a connector 48 which is in the form of a plurality of edge fingers, the connector 48 being located externally of the enclosure 46. The imager 28 is in the form of a light detector array which is mounted to the printed circuit substrate 26 within the enclosure 46. Metal lines 50 are formed on the printed circuit substrate 26 and interconnect to the connector 48 with the imager 28, thus placing the connector 48 within electrical communication with the imager 28. Fingers on the connector 48 are for power and control signals to be provided to and image data to be communicated with the imager 28.

Each elongate member 30, 32, 34 and 36 is made of a spring material such as steel or beryllium copper. The first elongate member 30 has a first end 52 which is secured to the housing 12, and a second end 54 located within the housing 12 and remotely from an inner wall of the housing 12. Similarly, the second, third, and fourth elongate members 32, 34 and 36 each have a respective first end 52 secured to the housing 12, and a respective second end 54 located remotely from an inner wall of the housing.

The first end 52 of the first elongate member 30 is spaced from the first end 52 of the third elongate member 32 in the direction in which the center line 40 extends, and the second end 54 of the first elongate member 30 is spaced from the second end 54 of the third elongate member 34 also in the direction in which the center line 40 extends. Similarly, the first end 52 of the second elongate member 32 is spaced from the first end 52 of the fourth elongate member 36 in the direction in which the center line 40 extends, and the second end 54 of the second elongate member 32 is spaced from the second end 54 of the fourth elongate member 36 in the direction in which the center line 40 extends.

The mounting structure 38 is in the form of a tube located within the enclosure 46 and having a center line which substantially corresponds with the center line 40 of the housing 12. One end 56 of the mounting structure 38 is secured to the second end 54 of the first elongate member 30 and to the second end 54 of the second elongate member 32. An opposing end 58 of the mounting structure 38 is secured to the second end 54 of the third elongate member 34 and to the second end 54 of the fourth elongate member 36.

The first, second, third, and fourth lenses 16, 18, 20, and 22 are mounted within and directly to the mounting structure 38. Each one of the lenses 16, 18, 20, and 22 has an axis of revolution which substantially corresponds with the center line 40 of the housing 12.

Figure 2:
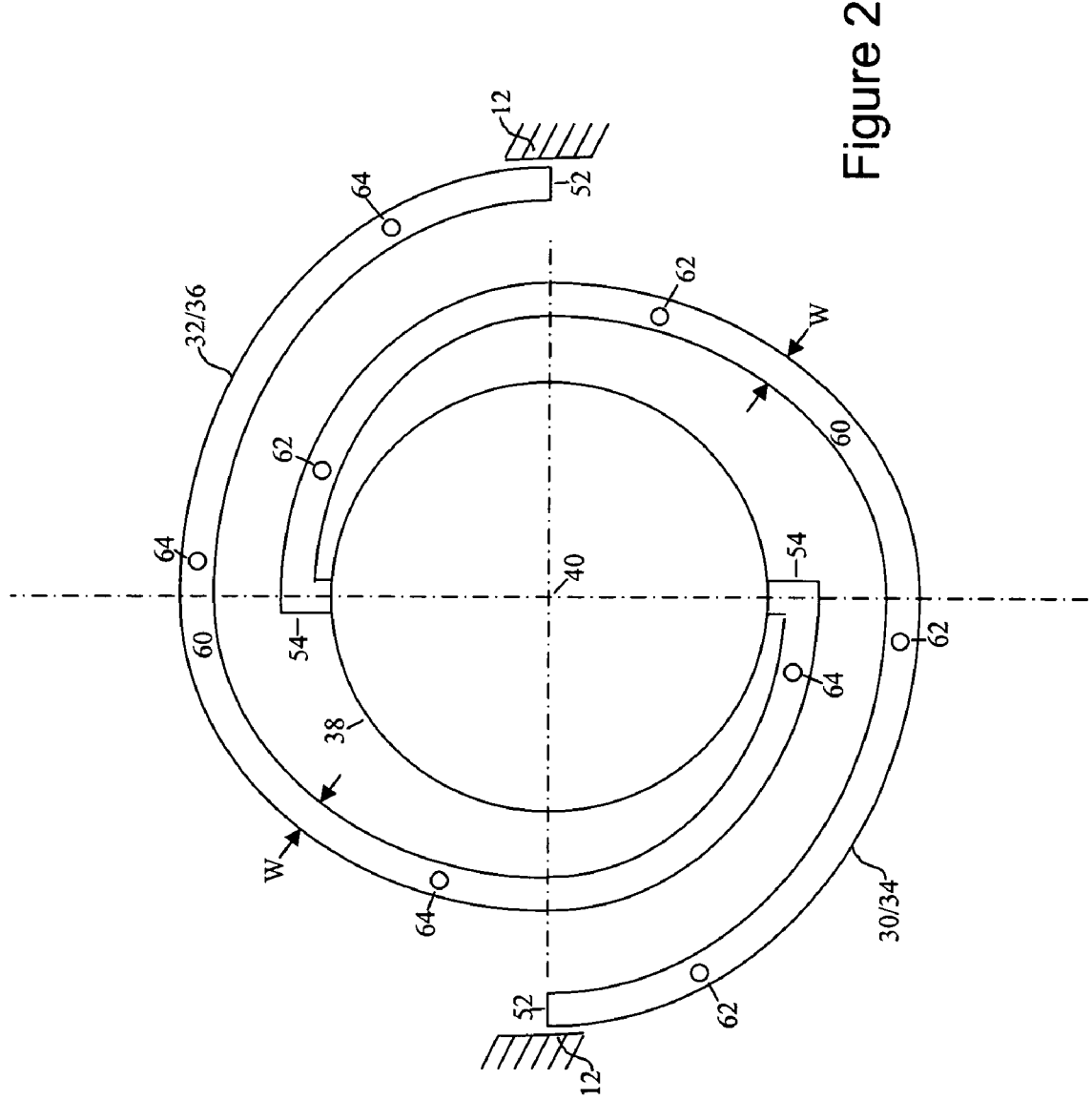
FIG. 2 is a plan view of certain components of the camera subassembly of FIG. 1.

FIG. 2 illustrates the first and second elongate members 30 and 32 when viewed in the direction in which the center line 40 extends. The first elongate member 30 has a central portion 60 between the first and second ends 52 and 54 thereof which coils in the form of a spiral about the center line 40. The second elongate member 32 has exactly the same construction as the first elongate member 30 and also has a central portion 60 which coils, in the same plane as the first elongate member 30, about the center line 40.

The first ends 52 of the first and second elongate members, 30 and 32 respectively, are connected to the housing on opposing sides of the mounting structure 38, and the second ends 54 of the first and second elongate members, 30 and 32 respectively, are connected to the mounting structure 38 on opposing sides thereof. Although only the first and second elongate members 30 and 32 are shown in FIG. 2, it should be understood that the third and fourth elongate members 34 and 36 have exactly the same constructions as the first and second elongate members 30 and 32 and are positioned relative to one another in exactly the same manner as the first and second elongate members 30 and 32, respectively.

Stiffener elements 62 are provided, each stiffener element 62 being connected between the first elongate member 30 and the third elongate member 34. More stiffener elements 64 are provided, each stiffener element 64 being connected between the second elongate member 32 and the fourth elongate member 36.

The movement imparting apparatus includes first and second stationary portions 66 and 68, and first and second electric coils 70 and 72.

The first electric coil 70 is located externally of and is mounted directly to the mounting structure 38. The first stationary portion 66 includes a permanent magnet 74 which is mounted on an inner wall of the housing 12, and a pole piece 76 extending from the permanent magnet 74 and having a portion located within the first electric coil 70.

The second electric coil 72 is located externally of and is mounted directly to the mounting structure 38 on a side thereof opposing the first electric coil 70. The second stationary portion 68 includes a permanent magnet 74 mounted to an inner wall of the housing 12 on a side thereof opposing the permanent magnet 74 of the first stationary portion 66, and a pole piece 76 extending from the permanent magnet 74 and having a portion located within the second electric coil 72.

The second end 54 of the first elongate member 30 is electrically connected to one end of the first electric coil 70, and the second end 54 of the third elongate member 34 is electrically connected to an opposing end of the first electric coil 70. The first end 52 of the first elongate member 30 is electrically connected via an electrical line 78 to one of the metal lines 50 on the printed circuit substrates 26, and the first end 52 of the third elongate member 34 is similarly connected to one of the metal lines 50. The first and third elongate members 30 and 34 themselves are conductive. Electrical power and ground can thus be provided from the connector 48 respectively through the first and third elongate members 30 and 34 to opposing ends of the first electric coil 70.

In a similar manner, electrical power and ground can be provided through the second and third elongate members 30 and 36 to opposing ends of the second electric coil 72.

The entire camera subassembly 10 may be assembled under controlled conditions and with optical components which will ensure optimum optical performance. A camera subassembly 10 is so provided wherein all components are preassembled according to predetermined design criteria and for example, the imager 28 is optimally chosen and positioned, and the length of the housing is invariable. The camera subassembly 10 may then be mounted within any suitable body of any suitable camera and the connector 48 be connected to a computer of the camera in a manner which ensures correct functioning of the imager 28 and which provides power and ground to the first and second electric coils 70 and 72.

In use, light enters the housing 12 through the window 14 in the direction in which the center line 40 of the housing 12 extends. The light then passes through the lenses 22, 20, 18, and 16 respectively, and is focused on the imager 28. The imager 28 digitizes the light into pixels and provides image data through the metal lines 50 to the connector 48 and the computer of the camera. The computer of the camera determines whether an image created on the imager 28 is in focus and, depending on whether or not the image is in focus, increases or decreases power supplied to the first and second electric coils 70 and 72.

The electric coils 70 and 72 cooperate with the stationary portions 66 and 68, according to conventional principles relating to electromagnets, to cause movement of the electric coils 70 and 72 relative to the stationary portions 66 and 68 along the center line 40. Movement of the electric coils 70 and 72 is in a direction in which the center line 40 extends and results in movement of the first, second, and third lenses 16, 18, and 20 relative to the imager 28 in the direction in which the center line 40 extends. By controlling power supplied to the electric coils 70 and 72, the positioning of the first, second, third, and fourth lenses 16, 18, 20, and 22 can be controlled relative to the imager 28 in a manner which ensures that an image created on the imager 28 remains in focus. The electric coils 70 and 72 are relatively light, and the mounting structure 38 is typically a lightweight plastic construction so that focusing is not substantially encumbered by excess mass.

Movement of the mounting structure 38, and the first, second, and third lenses 18, 20, and 22 in the direction in which the center line 40 extends is allowed for due to bending of the elongate members 30, 32, 34, and 36 and corresponding movement of the second ends 54 of the elongate members 30, 32, 34, and 36 in unison in the direction in which the center line 40 extends. The second ends 54 have a tendency to move relatively long distances in the direction in which the center line 40 extends without moving long distances in a direction transverse to the direction in which the center line 40 extends due to the elongate nature of the members 30, 32, 34, and 36.

Each elongate member 30, 32, 34, and 36 has a width W in a direction transverse to the direction in which the center line 40 extends, and a thickness T in a direction in which the center line 40 extends. The width W is substantially more than the thickness T so that movement of the second ends 54, due to bending of the members 30, 32, 34 or 36, in a direction transverse to the direction in which the center line 40 extends is substantially prevented, while still allowing for sufficient flexibility to allow for movement of the second ends 54 in the direction in which the center line 40 extends.

Any remaining tendency for the second ends 54 to move transversely to the direction in which the center line 40 extends is counteracted because of symmetry of the members 30, 32, 34, and 36. For example, because the second ends 54 of the first and second elongate members 30 and 32 are mounted on exactly opposing sides of the mounting structure 38, a resultant of forces created on the mounting structure 38 in a direction transverse to the direction in which the center line 40 extends is exactly zero. One of ordinary skill in the art would appreciate that a configuration using three, four, five or more elongate members may also be arranged to ensure cancellation of forces by symmetry.

The first, second, third, and fourth lenses 16, 18, and 20 therefore move backward and forward only in the direction in which the center line 40 extends. The stiffener elements 62 and 64 ensure movement only in the direction in which the center line 40 extends also under conditions wherein the elongate members 32, 34, and 36 are more severely bent i.e., the stiffeners prevent lateral movement due to twisting of the elongate members 32, 34, and 36.

Alignment of the axis of revolution of the first, second, and third lenses 16, 18, and 20 is ensured because of cooperation of the first and second elongate members 30 and 32 with the third and fourth elongate members 34 and 36. For example, a rectangle is formed having corners respectively at the first end 52 of the first elongate member 30, the second end 54 of the first elongate member 30, the second end 54 of the third elongate member 34, and the first end 52 of the third elongate member 34. Bending of the first and third elongate members 30 and 34 results in parallelogram-like movement wherein a line between the second ends 54 of the first and third elongate members 30 and 34 remains parallel to a line between the first ends 52 of the first and third elongate members 30 and 34. The line between the second ends 54 of the first and third elongate members 30 and 34 thus remains parallel to the center line 40 so that the orientation of the mounting structure 38 remains constant relative to the orientation of the center line 40, and the axes of revolution of the first, second, third, and fourth lenses 16, 18, 20, and 22 remain aligned with the center line 40.

Figure 3:
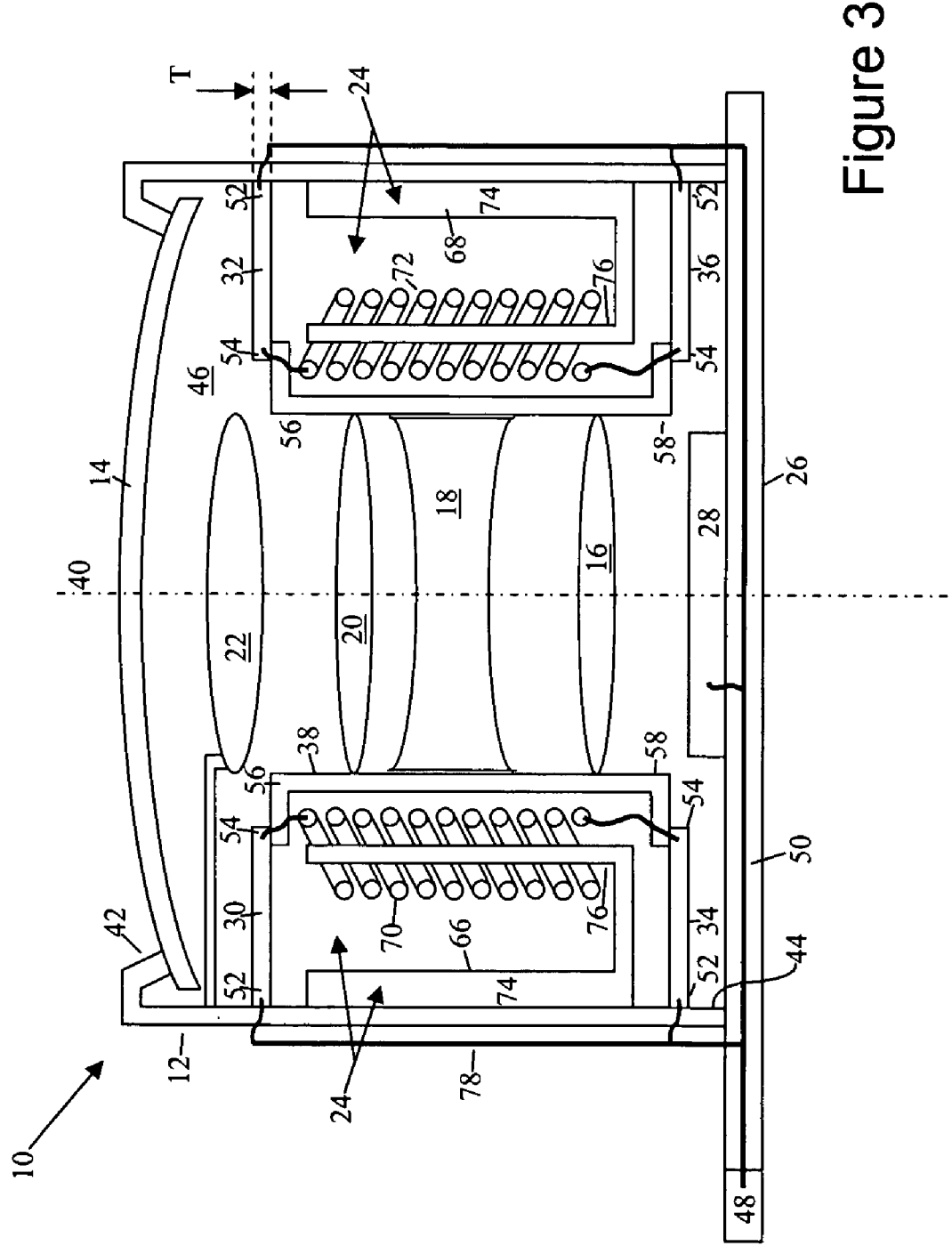
FIG. 3 is a cross-sectional side view of a camera subassembly according to an alternative embodiment of the invention.

An advantage of having all four lenses 16, 18, 20, and 22 mounted to the mounting structure 38 is that they remain in constant spacial relationship relative to one another. Focusing can be accomplished by moving the lens packet including the mounting structure 38 and the lenses 16, 18, 20, and 22 in unison towards or away from the imager 28. Other embodiments are also possible. One such embodiment is shown in FIG. 3 which shows that the fourth lens 22 can be mounted to the housing 12 without intervention of the mounting structure 38. The fourth lens 22 is thus in a stationary position relative to the housing 12 and the lenses 16, 18, and 20 move relative to the fourth lens 22. Such relative movement will affect, and can be used for, focusing.

While certain exemplary embodiments have been described and shown in the accompanying drawings, it is to be understood that such embodiments are merely illustrative and not restrictive of the current invention, and that this invention is not restricted to the specific constructions and arrangements shown and described, since modifications may occur to those ordinarily skilled in the art.

What is claimed is:

1. A camera subassembly, comprising:
    a housing having a first opening through which light can enter into the housing, and a second opposing opening;
    a substrate, the substrate closing said second opening;
    a window which closes the first opening, the housing and the window being formed so that, when the housing is mounted to the substrate so that the substrate closes the second opening, the housing, and the substrate form an enclosure which is substantially sealed against ingress of contaminants;
    a first lens located within the enclosure;
    at least a first elongated member, said first elongated member having a first end coupled to the housing and a second end coupled to the first lens such that the first lens is moveable relative to the housing backward and forward in a direction in which light passes from the first opening through the housing to the second opening; and
    an electrically controlled movement imparting apparatus in the housing, said electrically controlled movement imparting apparatus at least partially secured to the housing and at least partially secured to the first lens, said electrically controlled movement imparting apparatus, when operated at time of camera subassembly operation, causes backward and forward movement of the first lens in the direction in which light passes through the housing.

2. The camera subassembly as claimed in claim 1 wherein the position of the first and second openings relative to one another cannot be changed.

3. The camera subassembly as claimed in claim 1 wherein the window comprises a refractory lens.

4. The camera subassembly as claimed in claim 1 wherein the substrate closing the second opening comprises:
    a printed circuit substrate to which the housing is mounted so that the printed circuit substrate closes the second opening such that the housing, the window and the printed circuit substrate form an enclosure which is substantially sealed against the ingress of contaminants; and
    an imager mounted within the enclosure to the printed circuit substrate in a position so that light is focused on the imager after passing through the window and the first lens.

5. The camera subassembly as claimed in claim 4 further comprising:
    a connector on the printed circuit substrate at a location external to the enclosure, the connector being within electrical communication with the imager.

6. The camera subassembly as claimed in claim 5 wherein the connector has terminals through which at least power and control signals can be supplied to and image data can be communicated with the imager.

7. The camera subassembly as claimed in claim 4 wherein the imager comprises a light detector array.

8. The camera subassembly as claimed in claim 1 wherein the first elongated member coils around an axis which extends in the direction in which light passes through the housing.

9. The camera subassembly as claimed in claim 8 wherein the first elongated member coils around an axis of revolution of the lens.

10. The camera subassembly as claimed in claim 1, further comprising:
    at least a second elongated member, said second elongated member having a first end connected to the housing and a second end connected to the first lens.

11. The camera subassembly as claimed in claim 10 wherein the first and second elongated members each coils around an axis which extends in the direction in which light passes through the housing.

12. The camera subassembly as claimed in claim 11 wherein the first elongated member coils in a first plane and the second elongated member coils together with the first elongated member in substantially the first plane.

13. The camera subassembly as claimed in claim 11, further comprising:
   a third elongated member, said third elongated member comprising
      a first end connected to the housing and spaced from the first end of the first elongated member in the direction in which light travels through the housing, and
      a second end connected to the first lens and spaced from the second end of the first elongated member in the direction in which light travels through the housing,
   wherein the third elongated member coils around an axis which extends in the direction in which light travels through the housing.

14. The camera subassembly as claimed in claim 13, further comprising:
   at least one stiffener element which is connected between the first elongated member and the third elongated member.

15. The camera subassembly as claimed in claim 13, further comprising:
   a fourth elongated member, said fourth elongated member comprising
      a first end connected to the housing and spaced from the first end of the second elongated member in the direction in which light travels through the housing, and
      a second end connected to the first lens and spaced from the second end of the second elongated member in the direction in which light travels through the housing,
   wherein the fourth elongated member coils around an axis which extends in the direction in which light travels through the housing.

16. The camera subassembly as claimed in claim 15 wherein the first end of the second elongated member is spaced from the first end of the fourth elongated member in the direction in which light passes through the housing, and the second end of the second elongated member is spaced from the second end of the fourth elongated member in the direction in which light passes through the housing.

17. The camera subassembly as claimed in claim 10 wherein, when viewed in the direction in which light travels through the housing, the first ends of respectively the first and second elongated members are connected to the housing on opposing sides of the first lens.

18. The camera subassembly as claimed in claim 17 wherein, when viewed in the direction in which light travels through the housing, the second ends of respectively the first and second elongated members are connected to the housing on opposing sides of the first lens.

19. The camera subassembly as claimed in claim 1, further comprising:
   a mounting structure within the enclosure,
   wherein the first member is mounted to the mounting structure and the first lens is mounted to the mounting structure so that the first lens is connected to the first member via the mounting structure.

20. The camera subassembly as claimed in claim 19, further comprising:
   at least one additional lens mounted to the mounting structure, the first lens and the at least one additional lens being moveable together with the mounting structure relative to the housing.

21. The camera subassembly as claimed in claim 20 wherein the first lens and the at least one additional lens through which the light passes between the first and second opening are mounted to the mounting structure.

22. The camera subassembly as claimed in claim 20 wherein only some of the lenses through which the light passes between the first and second opening are mounted to the mounting structure.

23. The camera subassembly as claimed in claim 1 wherein the electrically controlled movement imparting apparatus comprises a first electrical coil which causes movement of the first lens relative to the housing when energized.

24. The camera subassembly as claimed in claim 23 wherein the first electrical coil is located within the enclosure.

25. The camera subassembly as claimed in claim 24 wherein the first electrical coil is connected to the first lens.

26. The camera subassembly as claimed in claim 25 wherein the movement imparting apparatus includes a permanent magnet mounted to the housing, which cooperates with the first electric coil to cause movement of the first electric coil relative to the permanent magnet when the first electrical coil is energized.

27. The camera subassembly as claimed in claim 24 wherein the first member is at least partially conductive and the first electrical coil is electrically accessed through the first member.

28. A camera subassembly, comprising:
   a housing;
   a lens located in the housing; and
   at least a first elongated member having a first end secured to the housing and a second end secured to the lens so as to mount the lens to the housing, and an elongated section between the first and second ends to allow for backwards and forward movement of the lens relative to the housing in a direction of an axis of revolution of the lens,
   wherein the first elongated member has a thickness in a direction of the axis of revolution, and a width in a direction transverse to the axis of revolution, the width being more than the thickness.

29. The camera subassembly as claimed in claim 28 wherein at least the first member allows for movement of the lens in the direction of the axis of revolution only.

30. The camera subassembly as claimed in claim 29 wherein the first elongated member coils around the axis of revolution.

31. The camera subassembly as claimed in claim 28 wherein the first elongated member coils around the axis of revolution.

32. The camera subassembly as claimed in claim 28, further comprising:
   a second elongated member, said second elongated member comprising
      a first end connected to the housing and
      a second end connected to the lens, wherein the first ends of the first and second elongated members are spaced from one another in a direction in which the axis of revolution extends, and the second ends of the first and second elongated members are spaced from one another in a direction in which the axis of revolution extends.

33. A method of assembling a camera subassembly, said method comprising:
  mounting a first lens within an enclosure using a flexible member which allows for backwards and forward movement of the first lens relative to the housing, said housing having a first and a second opening, said housing having a second lens fixed to said housing;
  mounting a window to the first opening of the housing; and
  mounting a substrate to the second opening of the housing, the substrate and a window jointly defining an enclosure which is substantially sealed against ingress of contamination;
  wherein movement of the first lens relative to said second lens is controllable with an externally applied electrical signal at operation time of said camera subassembly.

34. A method of assembling a camera subassembly, said method comprising:
  closing an opening into a housing containing a first lens fixed to said housing with a window;
  locating a second lens within the housing; and
  interconnecting the second lens with the housing by at least a first flexible member which, due to its flexibility, allows for backward and forward movement of a second lens relative to the housing and first lens along a direction in which light travels through the housing;
  wherein the flexible member coils around an axis which extends in the direction in which light passes through the housing lens.

* * * * *